(12) United States Patent
Song

(10) Patent No.: US 7,409,189 B2
(45) Date of Patent: Aug. 5, 2008

(54) CALIBRATION AND TESTING ARCHITECTURE FOR RECEIVERS

(75) Inventor: Hongjiang Song, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 10/812,834

(22) Filed: Mar. 30, 2004

(65) Prior Publication Data

US 2005/0221763 A1    Oct. 6, 2005

(51) Int. Cl.
*H04B 17/00* (2006.01)

(52) U.S. Cl. .................. 455/67.11; 455/68; 455/127.3; 455/245.2; 455/113; 455/251.1; 375/319

(58) Field of Classification Search .............. 455/251.1, 455/67.11, 68, 115.1, 115.2, 67.14, 63.14, 455/339, 113, 91, 127.3, 245.2, 246.1, 192.1; 375/319
See application file for complete search history.

(56) References Cited

U.S. PATENT DOCUMENTS

| | | | | |
|---|---|---|---|---|
| 5,001,776 A | * | 3/1991 | Clark | 455/226.2 |
| 5,471,665 A | * | 11/1995 | Pace et al. | 455/343.2 |
| 5,898,912 A | * | 4/1999 | Heck et al. | 455/234.2 |
| 6,321,073 B1 | * | 11/2001 | Luz et al. | 455/239.1 |
| 6,498,929 B1 | * | 12/2002 | Tsurumi et al. | 455/296 |
| 6,717,981 B1 | * | 4/2004 | Mohindra | 375/219 |
| 6,876,859 B2 | * | 4/2005 | Anderson et al. | 455/456.1 |
| 7,085,587 B2 | * | 8/2006 | Oono et al. | 455/553.1 |
| 7,196,579 B2 | * | 3/2007 | Ozawa | 330/133 |
| 2002/0094792 A1 | * | 7/2002 | Oono et al. | 455/118 |
| 2003/0064696 A1 | * | 4/2003 | Akamine et al. | 455/311 |
| 2004/0157573 A1 | * | 8/2004 | Lee et al. | 455/197.2 |
| 2005/0181754 A1 | * | 8/2005 | Wu et al. | 455/251.1 |
| 2005/0208919 A1 | * | 9/2005 | Walker et al. | 455/296 |
| 2007/0047634 A1 | * | 3/2007 | Kang et al. | 375/226 |

* cited by examiner

*Primary Examiner*—Lana N. Le
*Assistant Examiner*—Amar Daglawi
(74) *Attorney, Agent, or Firm*—Schwegman, Lundberg & Woessner, P.A.

(57) ABSTRACT

A method and apparatus are provided to generate calibration signals to multiple stages in a receiver channel. The multiple stages are calibrated using multiple calibration circuits, where a controller controls each calibration circuit. The controller is coupled to the output of the final stage in the receiver channel through a single comparison unit. The output from the single comparison unit is used by the controller to calibrate each of the multiple stages.

14 Claims, 7 Drawing Sheets

CALIBRATION AND TESTING ARCHITECTURE FOR RECEIVERS

TECHNICAL FIELD

Embodiments of the invention relate generally to calibration and design-for-test architectures.

DETAILED DESCRIPTION

Figure 1:
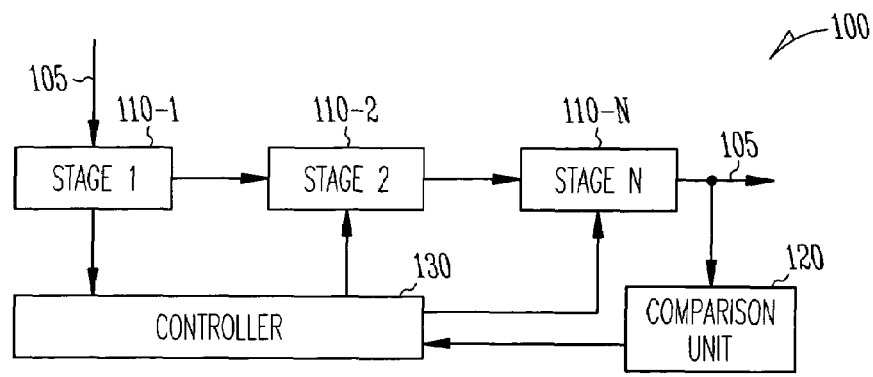
FIG. 1 shows a block diagram for an embodiment of an apparatus having multiple stages in a receiver channel, a comparison unit connected to an output of the final stage, and a controller connected to the comparison unit and coupled to each of the multiple stages, according to the present invention.

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

Very large scale integration (VLSI) for radio frequency (RF) systems is targeted at lower cost, higher performance, and lower power dissipation for portable communication products, such as cellar phones, personal data assistants (PDAs), mobile computer and various other wireless devices. Use of VLSI integration can be enabled through the adoption of low intermediate frequency (IF) or zero IF receiver architectures to directly convert the RF signal to a low IF/baseband signal, instead of using several stages of conversion/bandpass filtering as in the traditional super-heterodyne receivers. This approach avoids using high frequency, high Q bandpass SAW filters, which are also high cost, high power dissipation devices, whose integration is difficult or not practical. However, such integrated RF receivers are sensitive to direct current (DC) offset of the components in the receiver channels of the RF receivers.

In an embodiment, a multi-stage DC offset calibration and design-for-testing (DFT) architecture uses a single comparator at the final stage in a receiver channel to support all calibration circuits in the receiver channel. Such an arrangement using a calibration circuit at the final stage of the RF receiver channel to adjust for DC offset provides high DC offset detection sensitivity due to the high gain of the channel, which provides the amplification (for example, 100×) to the offset at the front-end stages. In addition the calibration circuits associated with the multiple stages leading to the final stage corrects for internal saturation of the receiver attributed to an offset voltage at the front-end stage. Without the calibration provided by the calibration circuits in various embodiments, the offset calibration circuit may fail when the offset voltage at the front-end stage is beyond a certain level (as low as a few mV) at nominal gain setting because of the internal saturation effects. This saturation effect becomes even worse at high gain setting. It is found that in some receiver integrated circuits without the offset calibration of the various embodiments a 1 mV offset at the frond-end stage may cause a receiver channel to saturate.

Embodiments for controlling calibration of multiple stages using a single comparator at an output of the final stage avoids the detection sensitivity limitation due to the fundamental device mismatch when using a comparator for the calibration circuit at the front-end stages where extremely small DC offset voltage (a few tenth of mV to approximately 1 mV) needs to be detected. The detection error in the calibration circuit using a comparator at the front end may fold back into the channel to degrade the receiver performance or even cause the receiver to malfunction. In addition, in designing a integration circuit (IC) the use of a single comparator at the final stage output also avoids a possible large area penalty in the receiver due to several calibration circuits each having its own comparator.

Embodiments for an architecture for a receiver channel having multiple stages with a single comparison unit coupled at an output of the final stage support the testing and/or characterization of the operations of the receiver channel. This testing and/or characterization can be realized through the architecture adapted for operationally reconfiguring the calibration circuit. This architecture overcomes the limited access points of typical integrated circuit RF receivers as compared to their discrete component counterparts. In various embodiments, the calibration circuits may be used to provide testing signals and test vectors rather than input ports of the RF IC. Using the calibration circuits allows for the generation of test signals and/or test vectors at an IF frequency. Embodiments using the calibration circuits may overcome the difficulties and testing impracticability associated with typical RF integrated receivers due to the difficulty in isolating the contribution of different non-ideal effects in a receiver channel, which may cause the receiver to malfunction because of the tight coupling of the performance parameters of the low noise amplifier (LNA), mixer, and filter circuits in the receiver channel.

Embodiments for the calibration and testing architectures discussed herein can also be used with various design practices including, but not limited to, using large device size, using symmetrical layout for better matching, and other design techniques.

FIG. 1 shows a block diagram for an embodiment of an apparatus 100 having multiple stages 110-1, 110-2 . . . and 110-N in a receiver channel 105, a comparison unit 120 connected to an output of final stage 110-N, and a controller 130 connected to comparison unit 120 and coupled to each stage 110-1, 110-2 . . . and 110-N. Controller 130 provides a signal to each stage 110-1, 110-2 . . . and 110-N to calibrate each of these stages. Controller 130 may be coupled directly to each stage 110-1, 110-2 . . . and 110-N or to a bus to which each stage 110-1, 110-2 . . . and 110-N is coupled.

Comparison unit 120 evaluates a signal passing through each stage to the final stage 110-N. In an embodiment, comparison unit 120 is adapted to compare differential intermediate versions of a received signal passing through multiple stages 110-1, 110-2 . . . and 110-N. Comparison unit provides the signal comparison for the calibration of each individual stage. Alternately each stage may have a dedicated comparison unit. However, having a single comparison unit to evaluate each stage in a multiple stage receiver stages provides for a reduced amount of redundant circuitry and provides for correlation of the calibration through a common controller. This configuration may also allow enhanced integration in fabricating an integrated circuit having a receiver channel with multiple stages. In an embodiment, comparison unit 120 has a single comparator coupled to the output of final stage 110-N. Alternately, comparison unit 120 may be a set of logic circuitry connected to the output of final stage 110-N. Comparison unit 120 may have a number of connections to the output of final stage 110-N to provide input to evaluate a signal propagating through receiver channel 105.

In an embodiment, controller 130 may be adapted to operate in several modes. These modes may include a calibration mode, a bypass mode, and a test mode. In the calibration mode, controller 130 controls the individual calibration of multiple stages 110-1, 110-2 . . . 110-N. Controller 130 may provide a single calibration signal or multiple calibration signals during a calibration operation. In a bypass mode, controller 130 may be adapted to decouple from receiver channel 105 to characterize the performance or behavior of receiver channel 105. In a test mode, controller 130 is reconfigurable to test receiver channel 105. In an embodiment, the test mode is realized through controller 130 configured with a design-for-test architecture in an integrated circuit. In such an embodiment, controller 130 is adapted to provide testing signals to multiple stages 110-1, 110-2 . . . and 110-N in receiver channel 105. In an embodiment, apparatus 100 is a portable wireless receiver.

Figure 2:
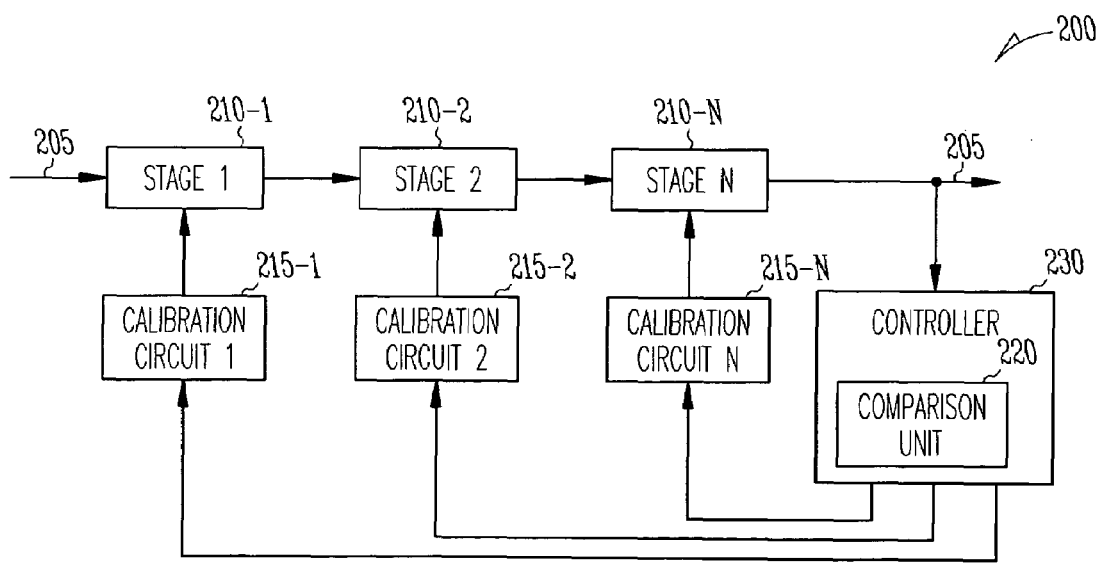
FIG. 2 shows a block diagram for an embodiment of an apparatus having multiple stages in a receiver channel with calibration circuits coupled to these stages and a controller coupled to an output of the final stage, according to the present invention.

FIG. 2 shows a block diagram for an embodiment of an apparatus 200 having multiple stages 210-1, 210-2 . . . 210-N in a receiver channel 205 with calibration circuits 215-1, 215-2 . . . and 215-N coupled to these stages, and a controller 230 coupled to an output of final stage 210-N. Controller 230 is coupled to each calibration circuit 215-1, 215-2 . . . 215-N to control each of the multiple calibration circuits and to control the calibrating of the multiple stages 210-1, 210-2 . . . 210-N. Controller 230 may be coupled directly to each calibration circuit 215-1, 215-2 . . . 215-N or to a bus to which each calibration circuit 215-1, 215-2 . . . 215-N is coupled.

In an embodiment, controller 230 includes a comparison unit 220 coupled to the output of final stage 210-N, where the output of final stage 210-N 2 provides a signal representative of a received signal at an input to receiver channel 205. Comparison unit 220 provides a single comparison point for evaluating the signal that passes through stages 210-1, 210-2 . . . 210-N of receiver channel 205. In an embodiment, comparison unit 220 is adapted to compare differential intermediate versions of the received signal passing through multiple stages 210-1, 210-2 . . . and 210-N. Controller 230 uses the output from the comparison unit 220 to individually control each calibration circuit 215-1, 215-2 . . . 215-N. Each calibration circuit 215-1, 215-2 . . . 215-N in turn individually calibrates its associated stage. In an embodiment, comparison unit 220 is a single comparator coupled to an output of the final stage. Alternately, comparison unit 220 is a set of logic circuits to acquire and evaluate a signal propagating from the output of final stage 210-N. In an embodiment, each calibration circuit 215-1, 215-2 . . . 215-N is assigned to one stage of multiple stages 210-1, 210-2 . . . 210-N. Each calibration circuit 215-1, 215-2 . . . 215-N is adapted to provide a DC offset calibration to each stage of multiple stages 210-1, 210-2 . . . 210-N.

Controller 230 may operate in several modes, including a calibration mode, a bypass mode, and a test mode. In a calibration mode, controller 230 controls each calibration circuits 215-1, 215-2 . . . and 215-N to provide calibration signals to one or more of the multiple stages 210-1, 210-2 . . . and 210-N. In a bypass mode, controller 230 and calibration circuits 215-1, 215-2 . . . and 215-N are adapted to decouple from receiver channel 205 to allow for the evaluation or characterization of receiver channel 205. In a test mode, controller 230 is reconfigurable to test receiver channel 205. In an embodiment, the test mode is realized through controller 230 configured with a design-for-test architecture in an integrated circuit. In such an embodiment, controller 230 is adapted to provide testing signals to stages multiple stages 210-1, 210-2 . . . and 210-N on receiver channel 205. In an embodiment, apparatus 200 is a portable wireless receiver.

Figure 3:
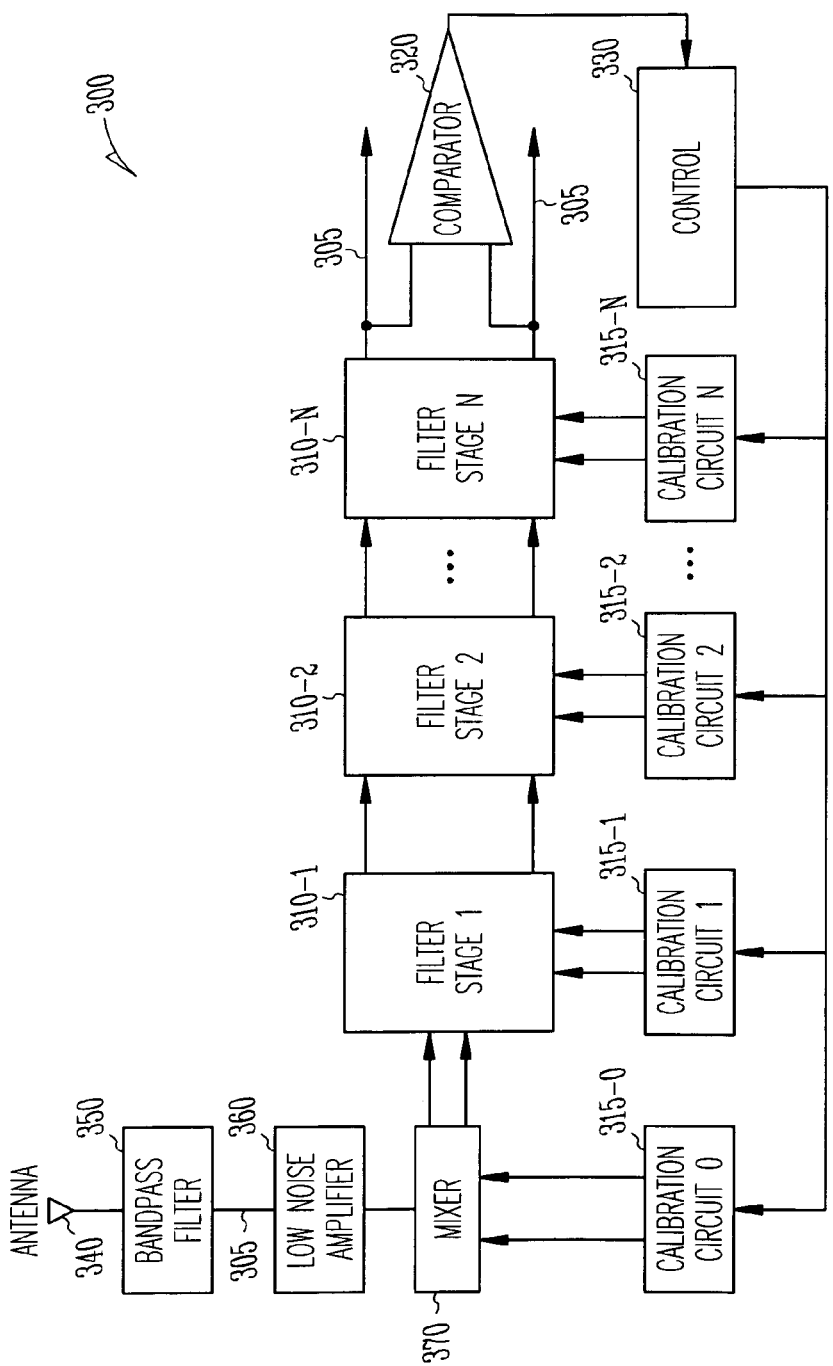
FIG. 3 shows a block diagram of an embodiment of a system including a receiver channel with multiple filter stages, multiple calibration circuits, a comparator coupled to an output of the final filter stage, and a control, according to the present invention.

FIG. 3 shows a block diagram of an embodiment of a system 300 including a receiver channel 305 with multiple filter stages 310-1, 310-2 . . . and 310-N, multiple calibration circuits 315-0, 315-1, 315-2 . . . and 315-N, a comparator 320 coupled to an output of final stage 310-N, and a control 330. System 300 includes antenna 340 that provides a signal to receiver channel 305, a bandpass filter 350 coupled to antenna 340, a low noise amplifier (LNA) 360 coupled to bandpass filter 350, and a mixer 370 that provides a differential signal to multiple filter stages 310-1, 310-2 . . . and 310-N. The signal received by antenna 340 may be converted to an in-phase signal and a quadrature signal. Each of the in-phase and quadrature signals propagates through its own receiver channel in the front end of the receiver for system 300. A separate receiver channel configured in various embodiments similar to the configuration in FIG. 3 may be used for simultaneously propagating each of the in-phase signal or quadrature signal. For each signal, a differential intermediate frequency (IF) is propagated in its particular receiver channel 305.

Comparator 320 is used to evaluate the differential IF signal to adjust or calibrate the multiple stages in receiver channel 305. Comparator 320 detects an imbalance in the differential IF signal received at its input and provides an output to control 330. The imbalance is related to a DC offset in one or more filter stages 310-1, 310-2 . . . and 310-N and mixer 370. Control 330 provides an appropriate calibration signal to the sequence of mixer 370 and filter stages 310-1, 310-2 . . . and 310-N beginning with mixer 370. Alternately, the sequence may begin with filter stage 310-1. In an embodiment, the calibration is applied at the output of the stage being calibrated. Alternately, the calibration may be applied at the input to the stage being calibrated. The calibration signal is provided to each calibration circuit 315-0, 315-1, 315-2 . . . 315-N via a bus from controller 330. Alternately controller 330 may be directly coupled to each calibration circuit 315-0, 315-1, 315-2 . . . and 315-N by an individual connection. The effects of the adjustment or calibration to each filter stage 310-1, 310-2 . . . 310-N and mixer 370 can be evaluated using comparator 320 before calibrating the next filter stage in the sequence. Alternately, the effect of adjustment in each filter stage 310-1, 310-2 . . . 310-N and mixer 370 on the signal passing through these stages can be evaluated. Other stages in a receiver channel such as receiver channel 305 may also have an associated calibration circuit.

Figure 4:
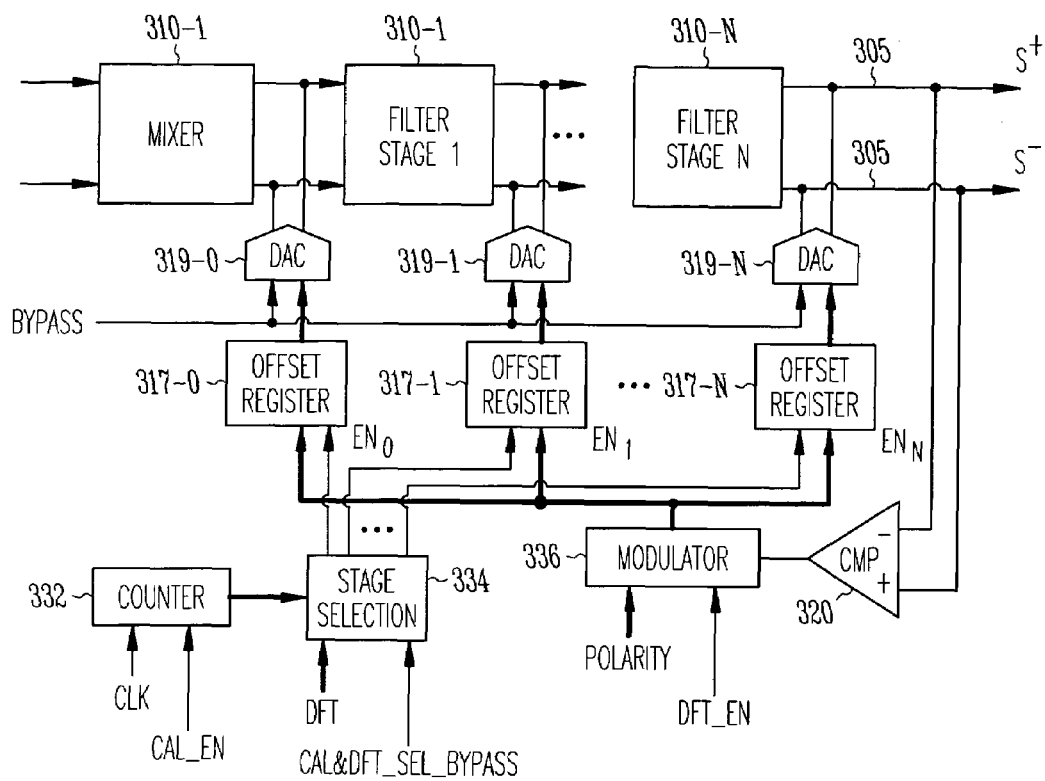
FIG. 4 illustrates an embodiment of a control and calibration circuits that can be used in the architecture shown in FIG. 3, according to the present invention.

FIG. 4 illustrates an embodiment of a control and calibration circuits that can be used in the architecture shown in FIG. 3. Control 330 and calibration circuits 315-0, 315-1, 315-2 . . . and 315-N of FIG. 3 may be realized as counter 332, stage selection 334, modulator 336, offset registers 317-0, 317-1, 317-2 . . . and 317-N, and digital to analog converters (DACs) 319-0, 319-1, 319-2 . . . and 319-N in FIG. 4. In an embodiment, each offset registers 317-0, 317-1, 317-2 . . . 317-N provides an input to each DAC 319-0, 319-1, 319-2 . . . 319-N on a one-to-one basis, where each pair, offset register and DAC, corresponds to single mixer 370 or single filter stage 310-1, 310-2 . . . or 310-N.

The embodiment for an architecture shown in FIG. 4 allows control 330 and calibration circuits 315-0, 315-1, 315-2 . . . and 315-N of FIG. 3 to operate in several modes including a calibration mode, a bypass mode, and a test mode. In an embodiment of a calibration mode, mixer 370 and filter stages 310-1, 310-2 . . . and 310-N are calibrated sequentially usually from the front-end to the back-end of receiver channel 305 using stage selection 334. In an embodiment, the calibration is applied at the output of the stage (mixer or filter stage) being calibrated. Alternately, the calibration may be applied at the input to the stage (mixer or filter stage) being calibrated.

During the calibration of mixer 370 and each filter stage 310-1, 310-2 . . . 310-N, the output DC offset is detected at comparator 320. Comparator 320 evaluates the differential signals, $S^+$ and $S^-$, to provide a signal to modulator 336. In an embodiment, modulator 336 is realized as an up/down counter including a input for control signal, POLARITY, to select whether counter 336 counts up or down. Based on the polarity of the offset, modulator (up/down counter) 336 is either incremented or decremented. The output of modulator 336 after digital to analog conversion by a selected one of DACs 319-0, 319-1, 319-2 . . . 319-N is used to adjust the DC offset at the corresponding mixer 370 or filter stage 310-1, 310-2 . . . or 310-N. When the calibration is completed, the output of modulator or counter, 336 is latched into the corresponding offset register 317-0, 317-1, 317-2 . . . 317-N.

The timing of the calibration sequence is provided by counter 332, which has a CLK input and a control signal, CAL_EN, to enable or regulate the operation in the calibration mode. The output from counter 332 to stage selection 334 is a digital signal that identifies the filter stage or mixer to be calibrated. The calibration sequence can also be changed using the calibration sequence control signal, CAL&DFT_SEL_BYPASS, input to stage selection 334, according to the desired application. Stage selection 334 may change from calibration to testing upon receiving the test state of control signal, DFT.

In the bypass mode, the entire calibration and testing circuits provided in the architecture of FIG. 4 is disabled and totally decoupled from receiver channel 305 of FIG. 3. This may be accomplished using control signal, BYPASS, to disable DACs 319-0, 319-1, 319-2 . . . 319-N from providing a signal to mixer 370 and filter stages 310-1, 310-2 . . . 310-N. Decoupling the calibration and control units from receiver channel 305 allows the native behavioral, performance of receiver channel 305 to be characterized.

In the test mode, or DFT mode since the architecture provides a design-for-testing architecture, modulator 336 is re-configured into a digital signal modulator, which can be used to generate a high linear ramp signal directly. The reconfiguration is accomplished by providing a control signal, DFT_EN, to modulator 336 to enable the reconfiguration of modulator 226. The insertion location for various types of test signals and test vectors is provided by stage selection 334 which enables a selected one of the offset registers 317-0, 317-1, 317-2 . . . or 317-N using the corresponding control signal, $EN_0$, $EN_1$ . . . or $EN_N$, respectively.

The linear ramp signal provided in various embodiments can be used to test the gain, bandwidth, DC offset, linearity and operation range of the channel, among other functions. The signal provided by modulator 336 may be used for the silicon debug of the design as well as manufacture testing. In addition, this DFT architecture may also support other types of test signals and/or test vectors, such as sinusoidal signals through the digital test vector input ports and DAC insertion points, and may be used for various testing and debug requirements.

Figure 5:
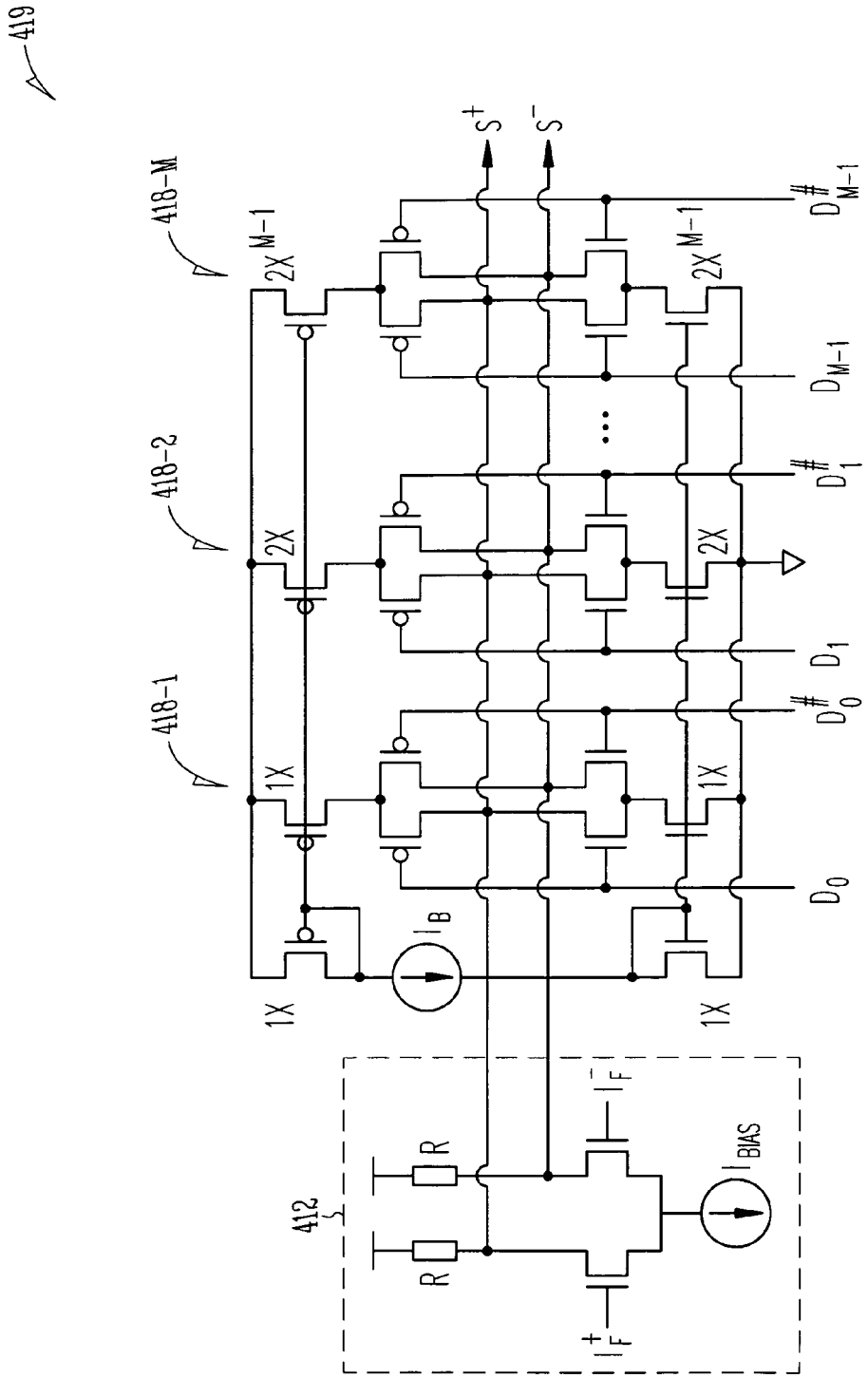
FIG. 5 shows an embodiment of a circuit structure that can be used for the digital-to-analog converters in FIG. 4, according to the present invention.

FIG. 5 shows an embodiment of a circuit structure that can be used for a digital-to-analog converter 419 in FIG. 4. DAC 419 is a circuit structure for an M-bit DAC coupled to stage 412. Stage 412 may be a filter stage from a previous one of the filter stages 310-1, 310-2 . . . 310-N or mixer 370 in the configuration of FIG. 4. Stage 412 provides the differential signals, $I_F^+$ and $I_F^-$, and may include its own current bias, $I_{BIAS}$. Each DAC 419 has a number of legs 418-1, 418-2 . . . 418-M essentially including a switch and load devices, where the number of legs, M, depends on the number of bits. The architecture of FIG. 4 may contain N+1 DACs corresponding to one mixer and N filter stages, each DAC having a M leg structure. In an embodiment, other stages in a receiver channel such as receiver channel 305 of FIG. 4 may also have an associated DAC. In an embodiment, DAC 419 adjusts for the DC offset to reduce the offset between signals $I_F^+$, $I_F^-$ and the output of the filter stage to which $S^+$, $S^-$ are input.

The input to DAC 419 to calibrate for a DC offset is provided by the M-bit signal. Leg 418-1 receives differential inputs $D_0$, $D_0^{\#}$, leg 418-1 receives differential inputs $D_1$, $D_1^{\#}$, leg 418-M receives differential inputs $D_M$, $D_M^{\#}$. The digital signal, $D_0 D_1 \ldots D_{M-1}$ is provided to DAC from its associated offset register when used in embodiments such as the configuration shown in FIG. 4.

Legs 418-1, 418-2 . . . and 418-M can be constructed using complementary metal oxide semiconductor (CMOS) technology as can be appreciated by those skilled in the art. Each leg 418-1, 418-2 . . . 418-M differs from each other by the size of the load transistor used in each leg. With 1× representing a unit transistor size to provide a specific current, a load transistor having a 2× size provides twice the current as the 1× sized transistor. Further, a $2^{M-1}$ load transistor provides $2^{M-1}$ times the current as the 1× sized transistor.

The circuit structure for DAC 419 that can be used as the DAC structure in the calibration & testing circuits of FIG. 4 has a range and resolution for the calibration at a given stage output, which may be presented as:

$$\begin{cases} V_{\max\ t}^{offset} = \pm R \cdot I_b \cdot 2^M \\ \Delta V_{\min}^{offset} = R \cdot I_b \end{cases}$$

The offset of each stage may be within 10 mV before amplified by the down-stream stages, and it can be further reduced to 1~4 mV with careful layout and sizing. A DC offset can be determined with the receiver channel biased on and a zero signal applied to the front end of the receiver channel. In various embodiments, using a DAC based on 2 to 4 bits at each calibration stage may reduce the overall offset down to a few tenths of a millivolt. In an embodiment, the offset is reduced to less than 0.5 mV. With the load resistance for R at about 400 ohms, the offset bias current $I_B$ ranges from about 0.5 µA to about 2 µA. Such a low current design allows for ease in circuit design with very low area and negligible power dissipation penalty in VLSI structures, compared with a conventional single-stage calibration circuit design using a current source greater than 100 µA.

Figure 6:
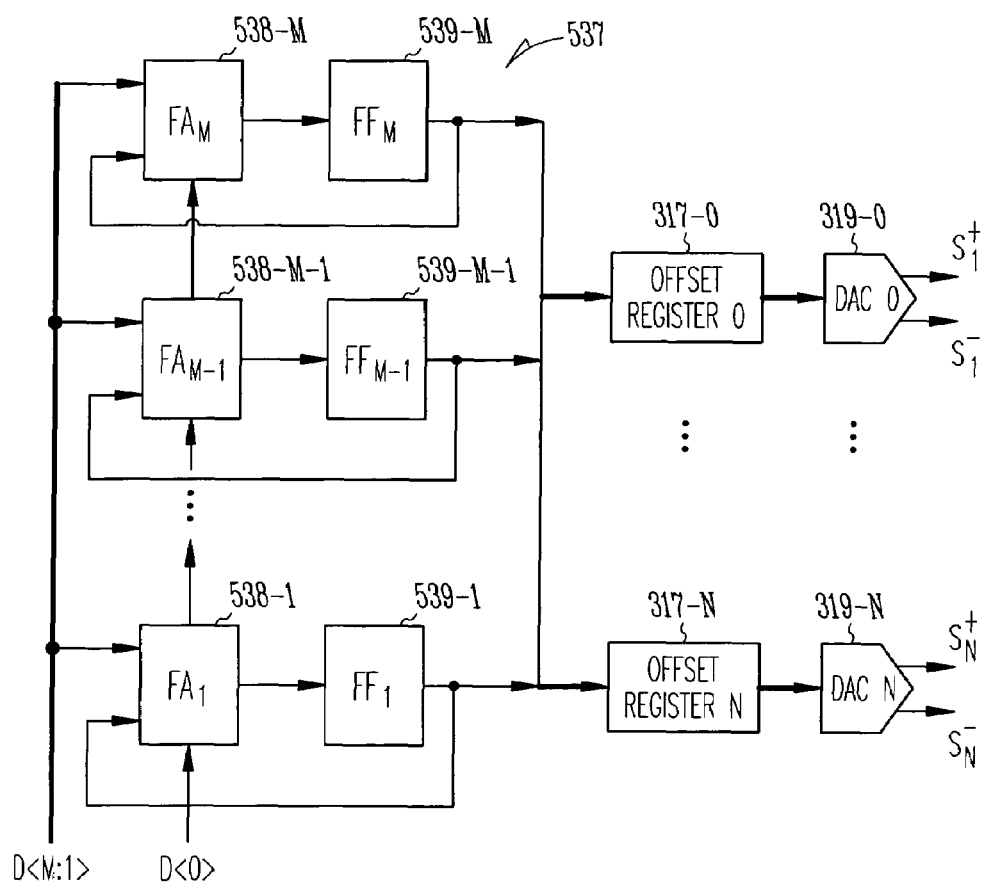
FIG. 6 shows a block diagram for a circuit implementation in a modulator for a test mode that can be implemented in the architecture of FIG. 4, according to the present invention.

FIG. 6 shows a block diagram for a circuit implementation of a counter 537 in a modulator for a test mode that can be implemented in the architecture of FIG. 4. Modulator 336 may implement counter 537 to provide test signals to one of more filter stages 310-1, 310-2 . . . 310-N in the architecture of FIG. 4. Counter 537 includes a number of full adders (FAs) 538-1, 538-2 . . . 538-M and flip flops (FFs) 539-1, 539-2 . . . 539-M in a paired arrangement. The number, M, of full adders and flip flops is equal to the number of bits used for each DAC 319-0, 319-1, 319-2 . . . 319-N, where N+1 is the number of stages in the receiver channel to calibrate. As can be appreciated by those skilled in the art, various other constructions for a counter can be implemented for use with offset registers and DACs in various embodiments of a calibration and testing architectures.

A word digital word, $D_0 D_1 \ldots D_{M-1}$, is provided by a bus to FAs 538-1, 538-2 . . . 538-M. $FA_1$ 538-1 receives bit $D_0$. An output from $FA_1$ 538-1 is provided to the next full adder and an output is provided to $FF_1$ 539-1. The outputs from flip-flops 539-1, 539-2 . . . 539-M are sent to offset registers 317-0, 317-1, 317-2 . . . and 317-N via a bus to provide input to their associated DACs. The signal from each DAC 319-0, 319-1, 319-2 . . . 319-N can be inserted to test its corresponding mixer 370 or filter stage 310-1, 310-2 . . . 310-N. By appropriately providing selection enable signals using stage selection 334, the status of mixer 370 and each filter stage 310-1, 310-2 . . . 310-N can be tested. For example, filter stage 2, 320-2, can be selected for test with a test signal inserted at filter stage 2, 320-2 using DAC 319-2. If the test result is evaluated as good and a similar test of filter stage 1, 320-1 is evaluated as not good, then the selective testing has isolated a problem at filter stage 1, 320-1.

Figure 7:
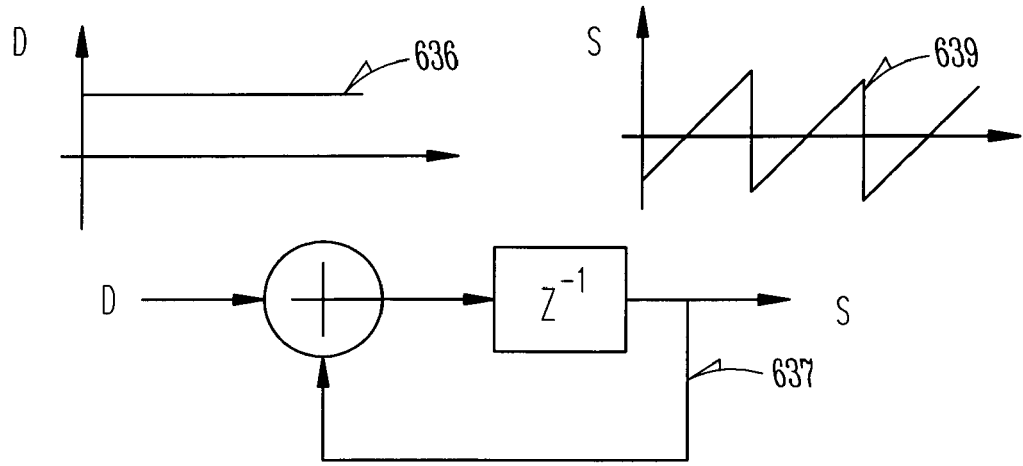
FIG. 7 shows an embodiment of a test signal provided by the counter of FIG. 6, according to the present invention.

Modulator 336 uses counter 537 to directly generate linear ramp signals at the desired test points with all available circuits. FIG. 7 shows an embodiment of a test signal provided by counter 537 of FIG. 6. The transfer function 637 between the input 636, D, to counter 537 and an output 639, S, from DAC 319-0, 319-1, 319-2 . . . or 319-N is given by $S(z)/D(z)=z^{-1}/[1-z^{-1}]$.

By using the control signal, CAL&DFT_SEL_BYPASS, in an embodiment for the architecture of FIG. 4 other types of signal generation may be supported in a test mode of operation. Additional circuitry can be added in modulator 336 to form an over-sampling digital modulator to provide enhanced resolution of the testing circuit.

Figure 8:
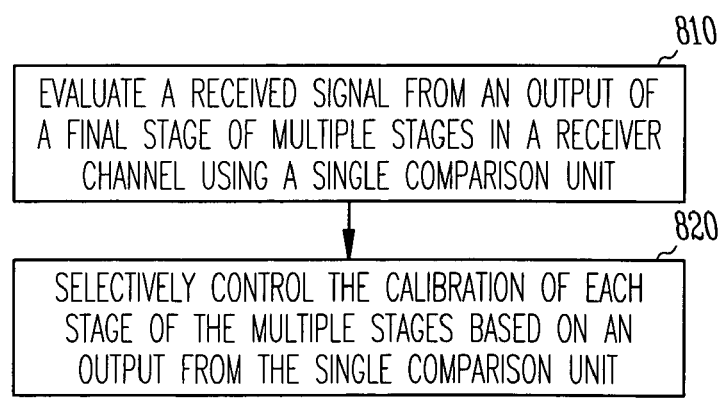
FIG. 8 shows a flow diagram of an embodiment of a method for calibrating multiple stages using a single comparison unit coupled to an output of the final stage, according to the present invention.

FIG. 8 shows a flow diagram of an embodiment of a method for calibrating multiple stages using a single comparison unit coupled to an output of the final stage. At 810, a received signal from an output of a final stage of multiple stages in a receiver channel is evaluated using a single comparison unit. In an embodiment, the comparison unit uses a single comparator. At 820, the calibration of each stage of the multiple stages is, selectively controlled based on an output from the single comparison unit.

In an embodiment, a method includes the calibration of the multiple stages to reduce a DC offset to less than 0.5 mV for each stage. The method may further be adapted using an embodiment of the architecture for calibration and testing to decouple a controller having the single comparison unit as an input component and decouple calibration circuits from the receiver channel to characterize the performance of the receiver channel. The method may also provide for reconfiguring the controller to test the receiver channel.

Various embodiments or combination of embodiments for apparatus and methods for calibrating multiple stages using a single comparison unit coupled to an output of the final stage, as described herein, can be realized in hardware implementations and combinations of hardware and software implementations. These implementations may include a computer-readable medium having computer-executable instructions for performing a method including controlling operational modes of a controller coupled to an output of the final stage of multiple stages in a receiver channel. One operational mode includes calibrating each stage of the multiple stages based on evaluating a received signal from the final stage using a single comparison unit. The computer-readable medium is not limited to any one type of medium. The computer-readable medium used will depend on the application using an embodiment of the calibration and testing scheme.

In an embodiment a computer-readable medium includes computer-executable instructions for providing a selection bypass signal to decouple the controller from the receiver channel and providing instructions to characterize a performance of the receiver channel with the controller decoupled from the receiver channel. The computer-readable medium may also include computer-executable instructions for providing a test enable signal to configure the controller to test the receiver channel.

Figure 9:
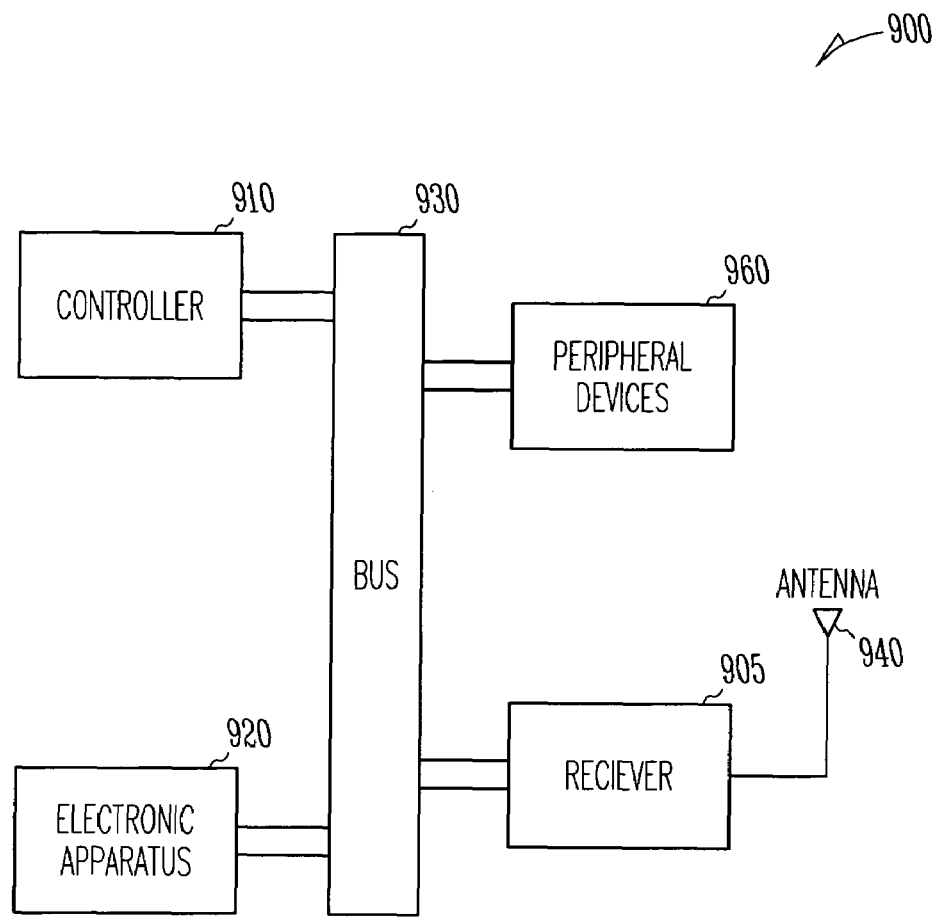
FIG. 9 illustrates a block diagram of an embodiment of a system that includes a receiver having an embodiment of a calibration architecture that uses a single comparison unit at an output of the final stage of multiple stages in a receiver channel to control the calibration of the receiver channel, according to the present invention.

FIG. 9 illustrates a block diagram of an embodiment of a system 900 that includes a receiver 905 having an embodiment of a calibration architecture that uses a single comparison unit at an output of the final stage of multiple stages in a receiver channel to control the calibration of the receiver channel. System 900 includes a controller 910, an electronic apparatus 920, and a bus 930, where bus 930 provides electrical conductivity between controller 910 and electronic apparatus 920, and between controller 910 and receiver 905. An embodiment may include an additional peripheral device or devices 960 coupled to bus 930. In an embodiment receiver 905 is coupled to an antenna 940. In an embodiment, antenna 940 is realized as a substantially omnidirectional antenna. Electronic system 900 may include, but is not limited to, information handling devices, stationary wireless systems, portable wireless systems, telecommunication systems, and computers.

In an embodiment, controller 910 controls transmission and reception of wireless signals using any appropriate wireless protocol for the application of system 900. Receiver 905, configured with an embodiment of a calibration architecture as taught herein, provides adjustment for DC offset in various stages in a receiver channel. Additionally, embodiments for the architecture provide a design-for-testing architecture to provide multiple testing capabilities. Receiver 905 may include a number of these calibration architectures, one for each receiver channel implemented in receiver 905. In an embodiment, receiver 905 is realized in an integrated circuit. In an embodiment, receiver 905 is realized in an RF receiver integrated circuit. Alternately, receiver 905 is realized as a receiver component in a multi-functional integrated circuit. In an embodiment controller 910 is a processor. In an embodiment, controller 910 is processor and electronic apparatus 920 include memory devices.

Peripheral devices 960 may include displays, additional storage memory, or other control devices that may operate in conjunction with controller 910. Alternately, peripheral devices 960 may include displays, additional storage memory, or other control devices that may operate in conjunction with controller 910, receiver 905, and/or electronic apparatus 920.

Embodiments for a calibration and testing architecture may be adapted to be used in any system operating with a wireless communication channel. Indeed, embodiments of the present invention may well be implemented as part of any wireless system using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and similar communication systems.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing the above description. The scope of the present invention includes any other applications in which embodiment of the above structures and fabrication methods are used. The scope of the embodiments of the present invention should be determined with reference to the appended claims, along with the full scope of equivalents to which such claims are entitled.

What is claimed is:

1. An apparatus comprising:
   multiple calibration circuits to calibrate multiple stages in a receiver channel; and
   a controller coupled to an output of a final stage of the multiple stages, the controller to control each of the multiple calibration circuits, wherein the controller includes:
      a stage selection circuit to sequentially calibrate each stage of the multiple stages, wherein each of the calibration circuits is assigned to a separate one of the multiple stages;
      a comparison unit coupled to the final stage to evaluate a received signal propagating through the receiver channel;
      multiple registers coupled to the stage selection circuit, each register associated with a separate one of the multiple stages, each register to hold a signal to provide DC offset calibration to its associated stage; and
      a modulator to provide each register with its signal to provide DC offset calibration to its associated stage, the modulator responsive to an output of the comparison unit.

2. The apparatus of claim 1, wherein the comparison unit includes a single comparator coupled to the output of the final stage, the output to provide a signal representative of a received signal at an input to the receiver channel.

3. The apparatus of claim 1, wherein the controller is adapted to decouple from the receiver channel to characterize performance of the receiver channel.

4. The apparatus of claim 1, wherein the apparatus is a portable wireless receiver.

5. The apparatus of claim 1, wherein the multiple stages are a sequence of filter stages in the receiver channel.

6. The apparatus of claim 1, wherein the multiple calibration circuits and the controller are adapted to decouple from the receiver channel.

7. The apparatus of claim 1, wherein the comparison unit is adapted to compare differential intermediate versions of the received signal.

8. The apparatus of claim 1, wherein the controller is reconfigurable to test the receiver channel.

9. An apparatus comprising:
   multiple calibration circuits to calibrate multiple stages in a receiver channel; and
   a controller coupled to an output of a final stage of the multiple stages, the controller to control each of the multiple calibration circuits, wherein the controller is reconfigurable to test the receiver channel and the controller includes:
      a stage selection circuit to select one or more of the multiple stages to receive a test signal;
      multiple registers, each register associated with a separate one of the multiple stages to provide its associated stage with its test signal, each register responsive to the stage selection circuit;
      a modulator having a test enable input and test signal circuits to provide each register with its test signal.

10. The apparatus of claim 9, wherein the apparatus includes
   a substantially omnidirectional antenna to receive a signal for the receiver channel; and
   a bandpass filter coupled to the antenna.

11. The apparatus of claim 9, wherein the controller includes a single comparator coupled to the final stage of the multiple stages in the receiver channel.

12. The apparatus of claim 9, wherein the stage selection circuit is configured to sequentially calibrate each stage in the multiple stages, wherein each of the calibration circuits is assigned to a separate one of the multiple stages.

13. The apparatus of claim 9, wherein the multiple calibration circuits and the controller are adapted to decouple from the receiver channel.

14. The apparatus of claim 9, wherein the apparatus is a portable wireless communication system.

* * * * *